(12) United States Patent
Heiss et al.

(10) Patent No.: US 7,481,476 B2
(45) Date of Patent: Jan. 27, 2009

(54) VEHICLE BODY

(75) Inventors: Harald Heiss, Munich (DE); Gerhard Neis, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 11/505,465

(22) Filed: Aug. 17, 2006

(65) Prior Publication Data
US 2006/0273629 A1  Dec. 7, 2006

Related U.S. Application Data

(63) Continuation of application No. PCT/EP2005/001731, filed on Feb. 18, 2005.

(30) Foreign Application Priority Data

Feb. 18, 2004  (DE) .................. 10 2004 007 781

(51) Int. Cl.
B62D 25/08  (2006.01)

(52) U.S. Cl. ............ 296/24.43; 296/181.4; 296/193.02; 296/193.04; 296/208; 280/756

(58) Field of Classification Search ............. 296/24.43, 296/181.4, 187.12, 190.09, 193.02, 193.04, 296/205, 207.01, 193.01, 203.01, 208; 280/756
See application file for complete search history.

(56) References Cited

U.S. PATENT DOCUMENTS

| 5,094,478 | A | * | 3/1992 | Pfanzeder et al. ............ 280/756 |
| 5,580,121 | A | * | 12/1996 | Dange et al. ............. 296/181.4 |
| 5,622,382 | A | * | 4/1997 | Zepnik et al. ............... 280/756 |
| 5,641,193 | A | * | 6/1997 | Zepnik et al. .......... 296/107.09 |
| 5,788,322 | A | * | 8/1998 | Wolf et al. ............... 296/181.4 |
| 5,881,458 | A |   | 3/1999 | Wolf et al. |
| 2005/0046235 | A1 | * | 3/2005 | Robertson et al. ...... 296/193.02 |
| 2005/0212277 | A1 | * | 9/2005 | Hamamoto et al. ......... 280/756 |

FOREIGN PATENT DOCUMENTS

| DE | 85 23 831.7 U1 | 11/1985 |
| DE | 94 21 370 U1 | 10/1995 |
| DE | 199 10 007 C1 | 3/2000 |
| DE | 199 43 582 A1 | 3/2001 |

(Continued)

OTHER PUBLICATIONS

International Search Report dated Nov. 11, 2005 with an English translation of the pertinent portion (fifteen (15) pages).

(Continued)

Primary Examiner—Jason S Morrow
(74) Attorney, Agent, or Firm—Crowell & Moring LLP

(57) ABSTRACT

As an alternative to a known partition between a passenger compartment and a luggage compartment of a passenger vehicle that is open at the top, a preassembly unit including a transverse member extending over the width of the vehicle and insertable into side receptacles fixedly mounted on the body is proposed. The transverse member is additionally supported via struts on the automotive body. The struts run obliquely downward and outward at an angle of approximately 45° to the transverse member, resulting in a large clearance below the transverse member that can be utilized for loading between the passenger compartment and the luggage compartment.

24 Claims, 3 Drawing Sheets

FOREIGN PATENT DOCUMENTS

| | | |
|---|---|---|
| DE | 201 03 001 U1 | 7/2001 |
| DE | 100 44 930 C1 | 3/2002 |
| DE | 101 16 347 A1 | 10/2002 |
| DE | 10 2004 016 362 A1 | 10/2004 |
| EP | 0 676 316 A1 | 10/1995 |
| FR | 2 859 431 A1 | 3/2005 |
| JP | 2000-177641 A | 6/2000 |
| WO | WO 02/076792 A1 | 10/2002 |

OTHER PUBLICATIONS

PCT/ISA/237 with an English translation of the pertinent portion (eleven (11) pages).

German Search Report dated Nov. 27, 2003 with and English translation of the pertinent portion (eight (8) pages).

\* cited by examiner

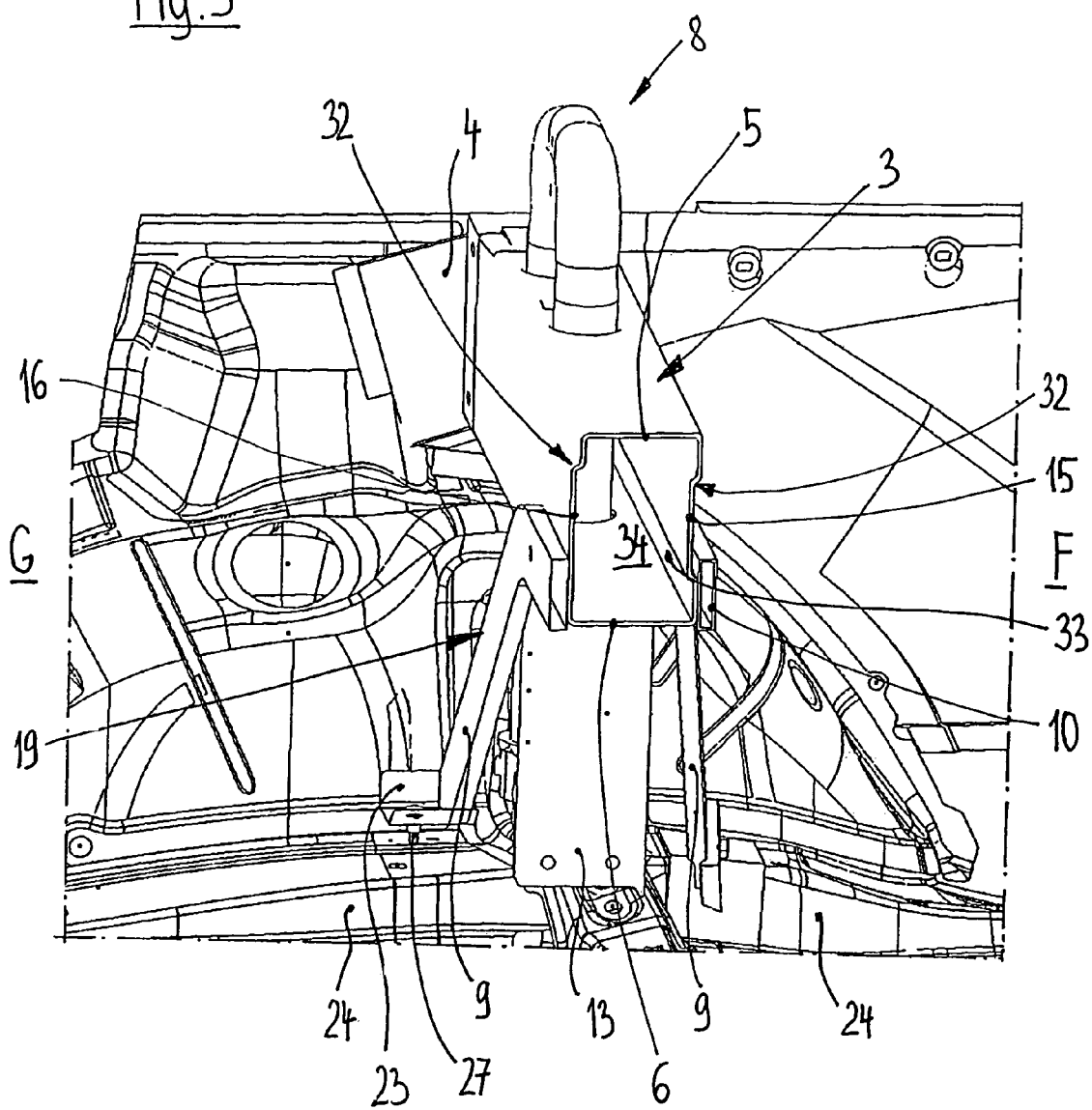

VEHICLE BODY

This application is a continuation of international PCT application PCT/EP2005/001731, filed Feb. 18, 2005, the entire disclosure of which is incorporated herein by reference.

This application also claims the priority of German application 10 2004 007 781.9, filed Feb. 18, 2004.

BACKGROUND AND SUMMARY OF THE INVENTION

The present invention relates to an automotive body, such as an automotive body of a passenger vehicle, that is open at the top and which includes a transverse member connecting the side structures of the body to one another approximately at chest height in the area between the passenger compartment and the luggage compartment.

German document DE 199 10 007 C1 describes a body of a vehicle, open at the top, having a transverse member extending over the width of the vehicle with through-openings for stationary U-shaped rollover bars. The transverse member is supported on pillar-like consoles on both sides of the vehicle, and the consoles are arranged on the transverse floor structure. In addition, flange bushings that accommodate the free end sections of the rollover bars are provided on the transverse floor structure.

German document DE 201 03 001 U1 describes a body for a vehicle that is open at the top with extendable rollover bars supported in a bar guide formed by a transverse member in conjunction with a profiled sheet metal partition.

Furthermore, German Patent Application 101 16 347.6, previously unpublished, discloses a body for a vehicle that is open at the top with rollover bars that are adjustable in height guided in through-openings in a transverse member. In the area of the end sections of the rectangular cross beam on the outside of the vehicle, its underside is removed in such a way that the three remaining walls of the transverse member form a "shoe" extending over the supports on the automotive body in a form-fitting manner.

An object of the present invention is to provide an automotive body having an improved loading option between the passenger compartment and the luggage compartment and/or simplified assembly of the transverse member in the automotive body.

This object is achieved by having at least one left strut, and at least one right strut, with each strut connected to the transverse member at one end in an area of its upper end section and running obliquely downward in a direction of outside of the vehicle and, at its lower end section at the other end, to the body. A receptacle for the transverse member may be provided so as to extend inward approximately horizontally from each of the side structures of the body. A preassembly unit for an inventive automotive body is also claimed.

A transverse member running at chest height or below approximately chest height may be connected by means of struts to the side structure of the body so that the struts run downward and outward obliquely approximately in the transverse plane of the vehicle. Since the struts run obliquely, a certain comparatively large clearance remains beneath the transverse member in comparison with that of known vehicle bodies, and this clearance may be used as a loading opening between the passenger compartment and the luggage compartment. The inside clearance is thus also large enough for transporting bulky goods, such as snowboards or golf bags. This yields advantages in comparison with known arrangements having only rectangular openings with comparatively small cross sections. The rigidity of the body is improved to a substantial extent while at the same time a weight advantage is yielded by having the diagonally running struts. Furthermore, a body according to the invention has low manufacturing costs and low weight because, instead of a separate partition, as is known from German document DE 201 03 001 U1, for example, only local struts need be used. Furthermore, automotive equipment such as control units may be arranged in the area of the transverse member and/or the struts.

In a preferred embodiment of the invention, the struts run at angles of approximately 45° with respect to the transverse member. The struts here lie essentially in a transverse plane of the vehicle which runs perpendicularly or deviates from the perpendicular line by only a slight angle (±10°). With this arrangement, the free end sections of the struts are situated in an area approximately at a right angle beneath the fastening of the transverse member to the side structure of the body.

In addition, it is also conceivable for the struts to form a larger angle with respect to the perpendicular because this yields an improved support for the transverse member and thus an increase in the rigidity of the body is achieved. The limited space available in vehicles, however, does not usually allow struts having a pronounced inclination.

A particularly high rigidity of the body without any negative effect on the inside clearance of the loading opening is obtained when the struts are provided in pairs in front of and behind the transverse member.

A further increase in the cross section available for a loading option is obtained when the connection point of at least one of the struts on the transverse member opposite the central longitudinal plane of the vehicle is offset laterally in the direction of the outside of the vehicle. This yields an additional clearance in the area of the central longitudinal plane of the vehicle.

In an advantageous embodiment of the invention, the struts of the right and left sides of the vehicle are manufactured from one piece, resulting in a V-shaped strut component. If the upper end sections of the struts are attached outside of the center of the vehicle, the one-piece strut component has a leg running parallel to the transverse member in the installed position, connecting the two inclined struts to one another. The strut component may be formed by a hollow profile having a rectangular cross section, for example, in which the two inclined strut sections are obtained by bending an originally linear semifinished product.

Especially simple assembly results when the transverse member and/or the struts is/are joined to the body by screws. A screw connection is also possible for the connection between the transverse member and struts.

In one claimed approach, receptacles are provided on the right and left sides of the body for connection of the transverse member to the automotive body. These receptacles protrude inward away from the side structure of the body. This yields a gain in design space below the transverse member in comparison with the known state of the art in which the pillar-like receptacles are provided. This design space may be utilized for the installation of vehicle equipment, for example.

A particularly simple assembly of the transverse member in the vehicle is obtained when the receptacles are designed so that the ends of the transverse member can be pushed onto or into them in a form-fitting manner. The insertion movement of the transverse member is then preferably in the vertical direction. Alternatively, the receptacles may have planar screw flanges for screw connection to the transverse member.

The receptacles are preferably designed as deep drawn and/or edged sheet metal shell components and are made of the same material as the side structure of the body to permit the simplest possible inexpensive connection to the side structure of the body.

The receptacles may also be designed as cast components, e.g., made of a lightweight metal material such as an aluminum alloy.

As already known from the state of the art, the transverse member is preferably designed so that it accommodates a stationary or height-adjustable rollover bar in through-openings. This results in further gains in terms of design space and weight.

With a transverse member having a rectangular cross section, for example, this yields an interior closed cavity which can be utilized in a particularly advantageous manner as an air guidance channel. This air guidance channel may be utilized in a closed vehicle or in a convertible with a closed top to vent or aerate the interior.

Advantages with regard to manufacturing costs and assembly time are obtained when the transverse member is assembled to yield a preassembly unit outside of the automotive body. The preassembly unit may be supplied as a complete module to the manufacturing line of the vehicle manufacturer. The scope of the preassembly includes the struts and/or some or all of the components of the rollover protection device and/or vehicle equipment such as control units, loudspeakers, cable trees, etc.

Possible embodiments of the present invention are illustrated in the drawing and described in greater detail below.

BRIEF DESCRIPTION OF THE DRAWINGS

FIG. 5 shows a perspective view showing a section of the transverse member in the area of the central longitudinal plane of the vehicle.

DETAILED DESCRIPTION OF THE DRAWINGS

Figure 1:
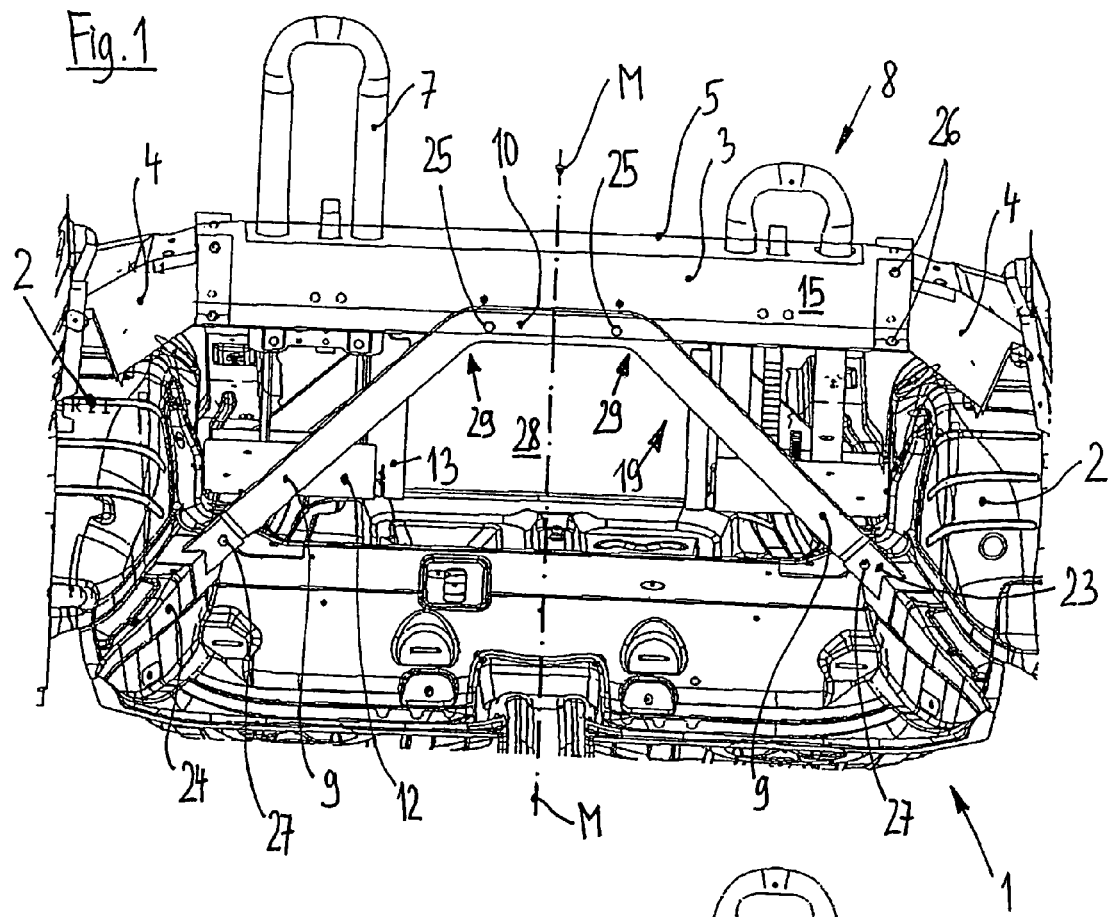
FIG. 1 shows a perspective view of an automotive body in the area of a transverse member between the passenger compartment and the luggage compartment, as seen opposite the direction of travel.

FIG. 1 shows a body of a vehicle (convertible), identified as 1 overall, that is open at the top. Between the two side structures 2 of the body, a transverse member 3 running horizontally in a transverse plane of the vehicle is provided at approximately chest height between right and left receptacles 4 in rigid mounts on the body. The transverse member 3 has an approximately rectangular cross section and has through-openings on the top side 5 and the bottom side 6 (see FIG. 2) of the hollow profile into which U-shaped rollover bars 7 of a rollover protection device, identified as 8 overall, are inserted.

On the front side 15 of the transverse member 3 as well as on its back side 16 (see FIGS. 2 and 5), right and left struts 9 are provided. Each of the struts runs at an angle of approximately 45° to the transverse member 3. These struts 9 provide additional support for the transverse member on the automotive body. The upper end sections of the struts 9 running obliquely down and outward on both sides of the transverse member 3 are joined together by legs 10 running approximately horizontally in the installed position and parallel to the transverse member 3. Each of the struts 9 and the leg 10 is formed by a one-piece strut component 19.

The symmetrical design with strut components 19 on the front side 15 and also on the rear side 16 of the transverse member 3 results in a particularly rigid connection of the transverse member 3 to the body which requires very little space at the same time.

The energy storage devices (usually helical springs—not shown) which serve to shift the rollover bar 7 into its use position are supported on consoles 12, which are connected to the transverse member 3 by mounts 13 running vertically.

Figure 2:
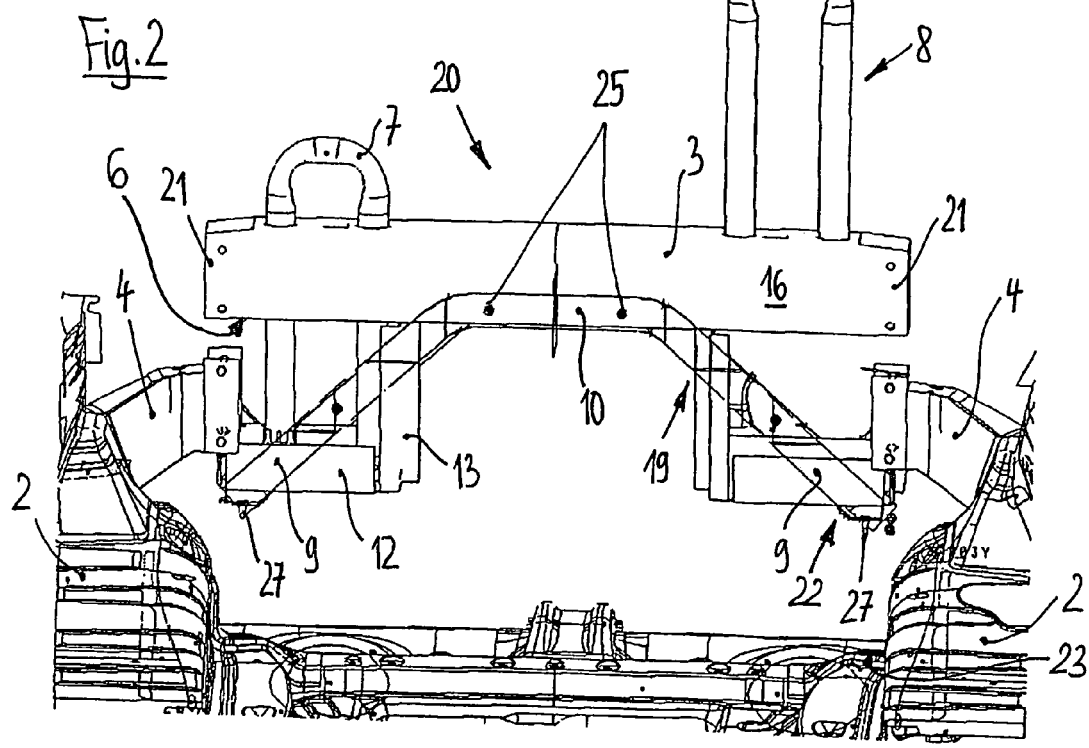
FIG. 2 shows a perspective view of the body of FIG. 1 with a preassembly unit comprising a transverse member, struts and rollover protection device before being inserted into the automotive body, as seen in the direction of travel.

FIG. 2 shows a preassembly unit, labeled as 20 in its totality, including a transverse member 3, rollover protection device 8, strut components 19, and consoles 12 with mounts 13 prior to installation in the automotive body 1. Additional equipment which may also be provided on the preassembly unit 20 is not shown in FIG. 2. For installation in the vehicle, the preassembly unit 20 is inserted vertically from above into the automotive body 1 with the help of a handling device. In doing so, the free end sections 21 of the transverse member 3 are placed into the receptacles 4 protruding inward away from the side structures 2 of the body. Although not shown in the drawing figures, it is also possible for molded parts, e.g., made of a lightweight cast metal, to be mounted on the free end sections 21 of the transverse member 3 to facilitate the screw connection of the transverse member 3 to the receptacles 4. The receptacles 4 are designed as sheet metal shell components made of steel to permit the simplest possible connection to the side structures 2 of the vehicle made of steel plate.

The free end sections 22 of the struts 9 end at consoles 23 which are placed on longitudinal beams 24 of the side structures 2 of the body and are attached to the longitudinal beams 24 by spot welding, for example. The connection between the transverse member 3 and the strut components 19 is accomplished by means of screws 25.

Figure 3:
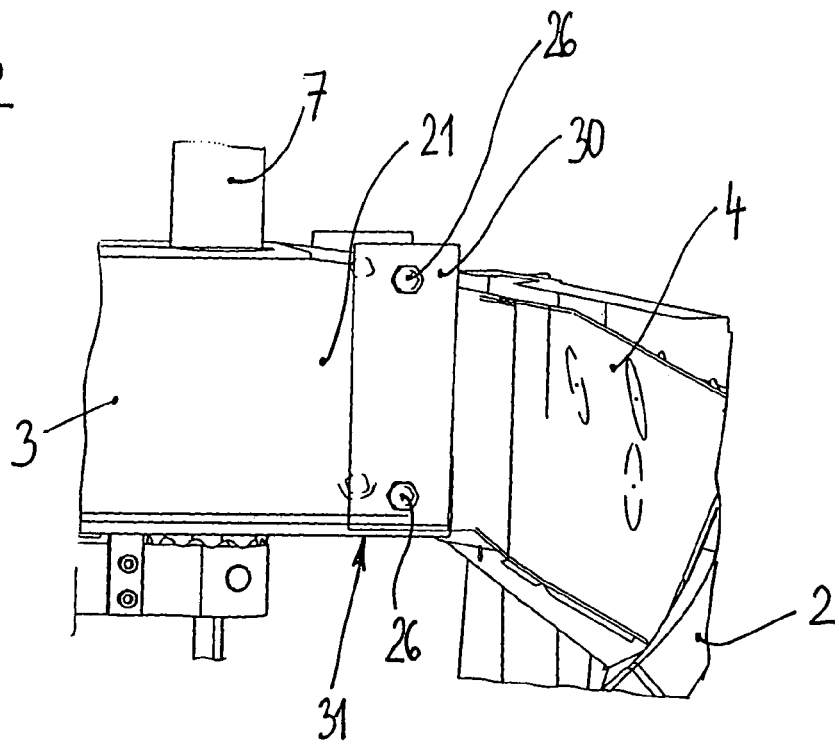
FIG. 3 shows an enlarged perspective view of the connection point between the transverse member and the side structure of the vehicle.
Figure 4:
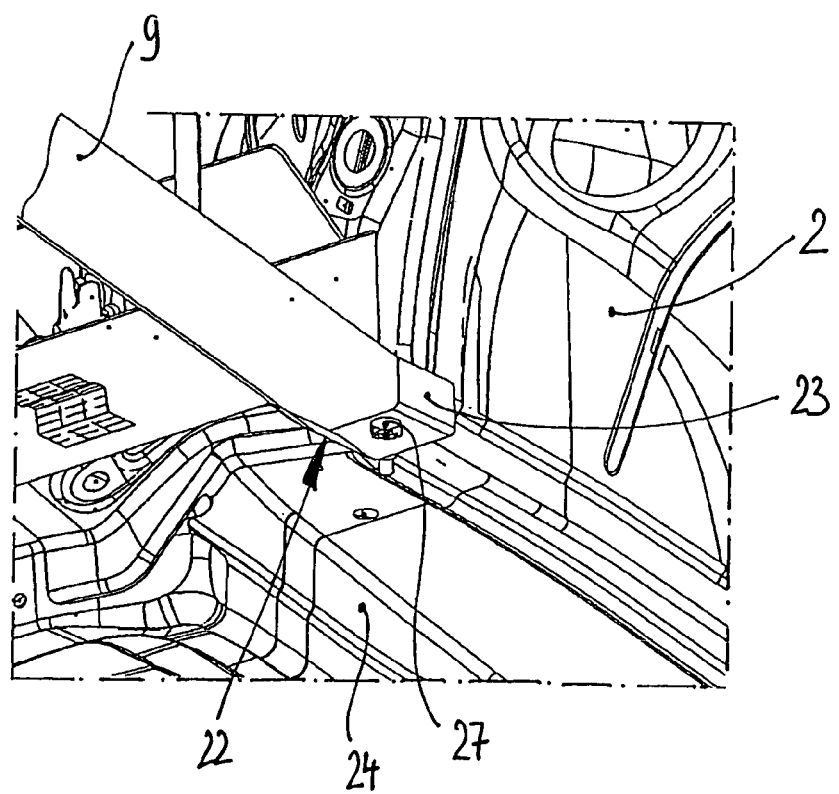
FIG. 4 is a view, corresponding to that of FIG. 3, showing the fastening of the free end section of the strut to the automotive body.

As illustrated in FIGS. 3 and 4, the transverse member 3 is bolted to the receptacles 4 (screws 26) after form-fitting insertion of its free end sections 21 into the receptacles 4. The receptacles 4 here are designed as "plug-in pockets" which are open at the top and have side walls 30 and a bottom 31. The free end sections 21 of the transverse member 3 are inserted into the interior of the "insertion pockets," where they are held in a form-fitting manner and are secured by the screws 26. Alternatively, the transverse member 3 could also be pushed onto the receptacles 4. To permit such attachment, the underside 6 of the transverse member 3 must be partially removed in the area of the receptacles. After insertion of the preassembly unit 20, the free end sections 22 of the struts 9 are also bolted to the longitudinal beams 24 (screws 27) via the consoles 23.

The screw connection (screws 26 and 27) yields a simple repair option. In the event of a defect in the rollover safety device 8 or an add-on unit, for example, the preassembly module 20 can be dismantled easily before performing the repairs.

FIG. 5 shows the preassembly unit, the transverse member 3 and the struts 9 in a sectional view (sectional plane=central longitudinal plane M of the vehicle according to FIG. 1). The transverse member 3 consists of an approximately rectangular extruded profile of aluminum with side lengths of approximately 140 mm×90 mm and a wall thickness of approximately 3 mm. The extruded profile is provided with embossing 32 to increase its rigidity and has nuts 33 to hold the screws 25 and 26.

The cavity 34 in the interior of the transverse member 3 may be used for air guidance, in particular for venting the passenger compartment F when the top of the convertible is closed, so that no separate air guidance channels are needed. This is advantageous with regard to design space, manufacturing cost and weight.

Each of the strut components 19 is made of rectangular steel tubes having edge lengths of approximately 50 mm×12 mm. The wall thickness of the rectangular tubes is approximately 2 mm.

FIG. 1, in particular, shows a large clearance (clearance 28) available below the transverse member 3 due to the inventive design which can be utilized for loading between the passenger compartment F and the luggage compartment G (see FIG. 5). The clearance 28 is bordered laterally by the consoles 13. In the areas 29 close to the transverse member 3, the inclined struts 9 cause only a minor restriction of the clearance 28 available for through-loading.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

We claim:

1. An automotive body of a passenger vehicle that is open at the top comprising:
   a transverse member, which connects the side structures of the body to one another approximately at chest height in the area between the passenger compartment and the luggage compartment,
   at least one left strut, and
   at least one right strut,
   the at least one left and right struts exclusively defining a partition increasing a rigidity of the body, between the passenger compartment and the luggage compartment below the transverse member;
   wherein each strut is connected to the transverse member at one end in an area of its upper end section and runs obliquely downward in a direction of outside of the vehicle and, at its lower end section at the other end, to the body, the struts and transverse member defining an opening for operatively connecting the passenger compartment and the luggage compartment.

2. The automotive body as claimed in claim 1, wherein the struts run at angles of approximately 45 to the transverse member.

3. The automotive body as claimed in claim 1, wherein a lower end section of at least one of the struts is approximately perpendicular below connecting points of the transverse member to the body when in the installed position.

4. An automotive body of a passenger vehicle that is open at the top comprising:
   a transverse member, connecting the side structures of the body to one another approximately at chest height in an area between a passenger compartment and a luggage compartment,
   at least one left strut, and
   at least one right strut, each strut being connected to the transverse member at one end in an area of its upper end section, extending obliquely downward in a direction towards outside of the vehicle and, being connected to the body at its lower end section at the other end, wherein the right and left struts, as seen in a direction of travel, are provided in front of and behind the transverse member.

5. The automotive body as claimed in claim 1, wherein the upper end sections of the struts are attached laterally to the transverse member outside of a central plane of the vehicle.

6. The automotive body as claimed in claim 1, wherein the right and left struts are manufactured in one piece in the form of a strut component.

7. The automotive body as claimed in claim 6, wherein the strut component has a leg running approximately horizontally in an installed position in the body, joining the upper end sections of the struts together.

8. An automotive body of a passenger vehicle that is open at the top comprising:
   a transverse member, connecting the side structures of the body to one another approximately at chest height in an area between a passenger compartment and a luggage compartment,
   at least one left strut, and
   at least one right strut, each strut being connected to the transverse member at one end in an area of its upper end section, extending obliquely downward in a direction towards outside of the vehicle and, being connected to the body at its lower end section at the other end, wherein the struts have closed rectangular cross sections, the at least one left and right struts exclusively defining a partition increasing a rigidity of the body, between the passenger compartment and the luggage compartment below the transverse member.

9. An automotive body of a passenger vehicle that is open at the top comprising:
   a transverse member, connecting the side structures of the body to one another approximately at chest height in an area between a passenger compartment and a luggage compartment,
   at least one left strut, and
   at least one right strut, each strut being connected to the transverse member at one end in an area of its upper end section, extending obliquely downward in a direction towards outside of the vehicle and, being connected to the body at its lower end section at the other end, wherein the struts are connected to at least one of the body and the transverse member by screws, the at least one left and right struts exclusively defining a partition increasing a rigidity of the body, between the passenger compartment and the luggage compartment below the transverse member.

10. The automotive body as claimed in claim 2, wherein a lower end section of at least one of the struts is approximately perpendicular below connecting points of the transverse member to the body when in the installed position.

11. The automotive body as claimed in claim 2, wherein the right and left struts, as seen in a direction of travel, are provided in front of and behind the transverse member.

12. The automotive body as claimed in claim 3, wherein the right and left struts, as seen in a direction of travel, are provided in front of and behind the transverse member.

13. The automotive body as claimed in claim 2, wherein the upper end sections of the struts are attached laterally to the transverse member outside of a central plane of the vehicle.

14. The automotive body as claimed in claim 3, wherein the upper end sections of the struts are attached laterally to the transverse member outside of a central plane of the vehicle.

15. An automotive body of a passenger vehicle that is open at the top comprising:
   side structures, and a transverse member which connects the side structures of the body to one another approximately at chest height in an area between a passenger compartment and a luggage compartment, the transverse member comprising a closed hollow profile with a cavity serving as an air guidance channel for venting and aerating the passenger compartment, wherein a receptacle for the transverse member extends inward approximately horizontally from each of the side structures of the body.

16. The automotive body as claimed in claim 15, wherein the receptacles are shaped in such a way that the transverse member can be inserted in a form-fitting manner into or pushed onto the receptacles.

17. The automotive body as claimed in claim 15, wherein the receptacles have flange surfaces for screw connections.

18. The automotive body as claimed in claim 15, wherein the receptacles are formed by sheet metal shells.

19. A preassembly unit for an automotive body as claimed in claim 15, assembled outside of the automotive body for subsequent installation in the body, wherein at least one of struts, a rollover protection device, and vehicle equipment is/are preassembled on the transverse member.

20. The automotive body as claimed in claim 1, wherein the transverse member comprises a cavity serving as an air guidance channel for venting and aerating the passenger compartment.

21. A preassembly unit for an automotive body as claimed in claim 4, assembled outside of the automotive body for subsequent installation in the body, wherein at least one of struts, a rollover protection device, and vehicle equipment is preassembled on the transverse member.

22. A preassembly unit for an automotive body as claimed in claim 8, assembled outside of the automotive body for subsequent installation in the body, wherein at least one of struts, a rollover protection device, and vehicle equipment is preassembled on the transverse member.

23. A preassembly unit for an automotive body as claimed in claim 9, assembled outside of the automotive body for subsequent installation in the body, wherein at least one of struts, a rollover protection device, and vehicle equipment is preassembled on the transverse member.

24. A preassembly unit for an automotive body as claimed in claim 1, assembled outside of the automotive body for subsequent installation in the body, wherein at least one of struts, a rollover protection device, and vehicle equipment is preassembled on the transverse member.

* * * * *